US008635254B2

(12) United States Patent  (10) Patent No.: US 8,635,254 B2
Harvey et al.  (45) Date of Patent: Jan. 21, 2014

(54) MAINTAINING INDEPENDENT STATES FOR MULTIPLE WEB BROWSER INSTANCES

(75) Inventors: Matthew Harvey, Providence, RI (US); Jared MacDonald, Somerville, MA (US); Andre Beskrowni, Providence, RI (US); Joshua Spiewak, Sharon, MA (US)

(73) Assignee: Axeda Corporation, Foxboro, MA (US)

( * ) Notice: Subject to any disclaimer, the term of this patent is extended or adjusted under 35 U.S.C. 154(b) by 94 days.

(21) Appl. No.: 10/637,757

(22) Filed: Aug. 8, 2003

(65) Prior Publication Data

US 2004/0133563 A1   Jul. 8, 2004

Related U.S. Application Data

(60) Provisional application No. 60/401,897, filed on Aug. 8, 2002.

(51) Int. Cl.
*G06F 17/30* (2006.01)
*H04L 29/08* (2006.01)

(52) U.S. Cl.
CPC ....... *G06F 17/30899* (2013.01); *H04L 29/0809* (2013.01)
USPC ........... 707/805; 707/608; 707/792; 707/812; 709/203

(58) Field of Classification Search
CPC ...................... G06F 17/30899; H04L 29/0809
USPC ........ 707/100, 10, 2, 3, 103, 104, 104.1, 790, 707/795, 803, 807, 608, 805, 812; 709/203, 709/204, 228, 227

See application file for complete search history.

(56) References Cited

U.S. PATENT DOCUMENTS

| | | | | |
|---|---|---|---|---|
| 5,954,798 A * | 9/1999 | Shelton et al. | ................. | 709/224 |
| 5,983,262 A * | 11/1999 | Kukkal | .......................... | 709/204 |
| 6,049,812 A * | 4/2000 | Bertram et al. | ................ | 715/205 |
| 6,182,129 B1 * | 1/2001 | Rowe et al. | ................... | 709/221 |
| 6,308,212 B1 * | 10/2001 | Besaw et al. | .................. | 709/228 |
| 6,377,162 B1 | 4/2002 | Delestienne et al. | | |
| 6,493,000 B1 * | 12/2002 | Wynn et al. | .................... | 715/733 |
| 6,539,494 B1 * | 3/2003 | Abramson et al. | ................ | 714/4 |
| 6,691,176 B1 * | 2/2004 | Narin et al. | .................... | 719/318 |
| 6,710,786 B1 * | 3/2004 | Jacobs et al. | .................. | 715/744 |
| 6,711,618 B1 * | 3/2004 | Danner et al. | ................ | 709/228 |
| 6,757,708 B1 * | 6/2004 | Craig et al. | .................... | 709/203 |
| 6,757,714 B1 | 6/2004 | Hansen | | |
| 6,760,047 B2 * | 7/2004 | Hough et al. | .................. | 715/753 |
| 6,832,355 B1 * | 12/2004 | Duperrouzel et al. | ........ | 715/788 |
| 6,886,046 B2 * | 4/2005 | Stutz et al. | .................... | 709/246 |
| 6,922,815 B2 * | 7/2005 | Rosen | .......................... | 715/782 |
| 6,931,526 B1 * | 8/2005 | Bacha et al. | .................. | 713/151 |
| 6,961,750 B1 * | 11/2005 | Burd et al. | .................... | 709/203 |

(Continued)

*Primary Examiner* — Dangelino Gortayo
(74) *Attorney, Agent, or Firm* — Fish & Richardson P.C.

(57) ABSTRACT

A method includes receiving a request for a target Web page, the request containing a session identifier (ID) associated with an instance of a Web browser, and determining if the session ID is new or existing. If the session ID is new, the method includes creating a window session object, and initializing the window session object with data defining a state of the instance of the Web browser. If the session ID is existing, the method includes accessing a stored window session object using the session ID, the stored window session object containing data defining a state of the instance of the Web browser, generating the target Web page based on the data, and providing the target Web page to the Web browser.

27 Claims, 3 Drawing Sheets

(56) References Cited

U.S. PATENT DOCUMENTS

| | | |
|---|---|---|
| 7,046,134 B2 | 5/2006 | Hansen |
| 7,065,568 B2 * | 6/2006 | Bracewell et al. ............ 709/223 |
| 7,082,460 B2 | 7/2006 | Hansen et al. |
| 7,089,563 B2 * | 8/2006 | Nagel et al. .................. 719/313 |
| 7,114,128 B2 * | 9/2006 | Koppolu et al. .............. 715/781 |
| 7,117,239 B1 | 10/2006 | Hansen |
| 7,149,792 B1 | 12/2006 | Hansen et al. |
| 7,178,149 B2 | 2/2007 | Hansen |
| 7,185,014 B1 | 2/2007 | Hansen |
| 7,188,183 B1 * | 3/2007 | Paul et al. .................... 709/229 |
| 7,254,601 B2 | 8/2007 | Baller et al. |
| 7,277,912 B2 * | 10/2007 | Corboy et al. ................ 709/203 |
| 7,546,538 B2 * | 6/2009 | Shuping et al. .............. 715/760 |
| 2001/0043235 A1 * | 11/2001 | Best et al. .................... 345/781 |
| 2002/0116550 A1 | 8/2002 | Hansen |
| 2002/0165909 A1 * | 11/2002 | Martin et al. ................. 709/203 |
| 2003/0023670 A1 * | 1/2003 | Walrath ....................... 709/203 |
| 2004/0027376 A1 | 2/2004 | Calder et al. |
| 2004/0177124 A1 | 9/2004 | Hansen |
| 2005/0021772 A1 | 1/2005 | Shedrinsky |
| 2007/0005736 A1 | 1/2007 | Hansen et al. |
| 2007/0011295 A1 | 1/2007 | Hansen |
| 2007/0078976 A1 | 4/2007 | Taylor et al. |
| 2007/0150903 A1 | 6/2007 | Hansen |
| 2007/0198661 A1 | 8/2007 | Hansen |
| 2008/0082657 A1 | 4/2008 | Hart et al. |
| 2008/0154957 A1 | 6/2008 | Taylor et al. |
| 2009/0013064 A1 | 1/2009 | Taylor et al. |

\* cited by examiner

MAINTAINING INDEPENDENT STATES FOR MULTIPLE WEB BROWSER INSTANCES

CROSS-REFERENCE TO RELATED APPLICATION

This application claims priority to U.S. Provisional Application No. 60/401,897, which was filed on Aug. 8, 2002. The contents of U.S. Provisional Application No. 60/401,897 are hereby incorporated by reference into this application as if set forth herein in full.

FIELD OF THE INVENTION

This invention relates to maintaining independent states for multiple World Wide Web ("Web") browser instances, such as browser windows.

BACKGROUND

HyperText Transfer Protocol ("HTTP") is a stateless protocol. Web servers and Web browsers support "cookies", which provide a state needed for a Web site. A cookie is a text file that a Web server sends to a Web browser, and that the Web browser returns to the Web server. The cookie contains state information relating to the Web browser. The Web server uses the state information to restore a previous state of a Web page on the browser.

Proxy servers or user preferences set in a Web browser can prevent the use of cookies. A technique for maintaining a Web browser state, which does not use cookies, is called "URL rewriting". As background, each HTTP command contains a uniform resource locator ("URL") and optionally some parameters. URL rewriting appends a session identifier ("ID") to every URL contained in a Web page. The session ID identifies a session and thus state information associated with that session. The session ID may be returned to the Web server when a user clicks on any link in the Web page. The Web server uses the session ID to restore the state of the Web page to the browser.

Thus, both cookies and URL rewriting may be used to preserve a state of a Web page during browsing. But, if multiple browser windows are opened, the state is shared between windows. As a result, actions in one window will affect the other windows. This is because a Web browser can support cookies from a Web server, but not related to individual windows. URL rewriting has a similar limitation, because it is concerned with tracking a state of a user, not the state of a browser window.

By way of example, two Web browser windows may be opened to compare stock prices. Each window may display a stock "ticker", which includes charts and date ranges. In conventional systems, changing a chart type or date range in one window will result in the same changes being made in another window when that other window is updated.

Having actions in one window affect states of other windows is not always desirable.

SUMMARY

In general, in one aspect, the invention is directed to a method of maintaining a state of an instance (e.g., a window) of a Web browser. The method includes receiving a request for a target Web page, where the request includes a URL-encoded session identifier ("ID") associated with the instance of the Web browser, and storing a window session object associated with the session ID. The window session object contains data defining the state of the instance of the Web browser.

By storing window session objects, the foregoing method provides for independent tracking of Web browser instances in an HTTP session. Thus, changing the state of one Web browser instance in that HTTP session may not necessarily result in corresponding changes in state of other Web browser instances in that HTTP session.

This aspect of the invention may include one or more of the features set forth below.

Storing the window session object may include creating the window session object, and initializing the window session object with data. The window session object may be stored in association with an HTTP session object. The HTTP session object may contain state data that relates to an interaction between the Web browser and a Web site that contains the target Web page.

The request may be an HTTP command that is issued from an original Web page. The original Web page may contain a control feature that contains the session ID. The control feature may be used to issue the request for the target Web page. The control feature may be at least one of a menu item, a hyperlink, a button and/or an image.

This aspect may include receiving a request for a second Web page, where the request includes a URL-encoded second session ID associated with a second instance of the Web browser, and storing a second window session object associated with the second session ID. The second window session object may contain data defining the state of the second instance of the Web browser.

In general, in another aspect, the invention is directed to a method that includes receiving a request for a target Web page, where the request includes a URL-encoded session ID associated with an instance of a Web browser, and accessing a window session object using the session ID. The window session object contains data defining a state of the instance of the Web browser. This aspect also includes generating the target Web page based on the data, and providing the target Web page to the Web browser.

This aspect of the invention may include one or more of the features set forth below.

The request may be issued from an original Web page. The original Web page may contain a control feature that contains the session ID. The control feature may be used to issue the request for the target Web page. The control feature may be at least one of a menu item, a hyperlink, a button and an image. The request may be an HTTP command.

This aspect may also include determining if the session ID is a new or existing, and accessing the window session object only if the session ID is existing. The Web page may be generated by encoding URL(s) in the target Web page with the session ID, and/or encoding URL(s) in the target Web page that open additional instances of the Web browser with new, unique session IDs.

In general, in another aspect, the invention is directed to method that includes receiving a request for a target Web page, where the request contains a session ID associated with an instance of a Web browser, and determining if the session ID is new or existing. If the session ID is new, the method includes creating a window session object, and initializing the window session object with data defining a state of the instance of the Web browser. If the session ID is existing, the method includes accessing a stored window session object using the session ID, the stored window session object containing data defining a state of the instance of the Web browser, generating the target Web page based on the data, and providing the target Web page to the Web browser.

In general, in another aspect, the invention is directed to a method of storing HTTP session information. The method include storing a plurality of states within a single HTTP session. The plurality of states each corresponds to a window of a Web browser that has been opened during the HTTP session. The plurality of states each may correspond to a parameter in an HTTP command that identifies a window of the Web browser.

Other aspects of the invention are directed to apparatuses, systems, and articles of manufacture, such as readable media that store executable instructions, which are used to perform the methods described above.

Other features and advantages of the invention will become apparent from the following description, including the claims and drawings.

BRIEF DESCRIPTION OF THE DRAWINGS

Like reference numerals in different figures indicate like elements.

DESCRIPTION

Figure 1:
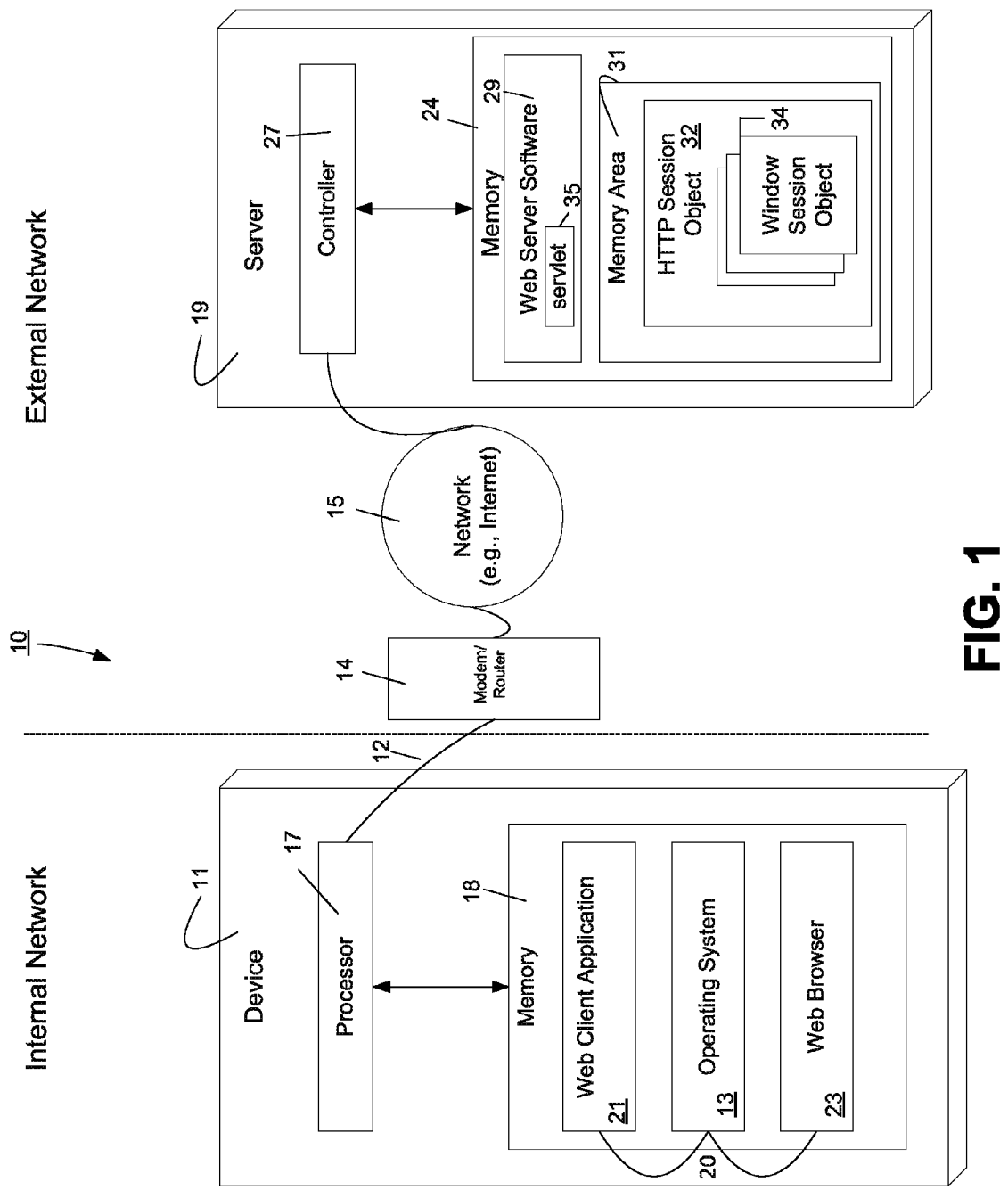
FIG. 1 is a block diagram of a network containing a server and a device, such as a computer.

FIG. 1 shows a network 10. Network 10 includes a device 11. Device 11 may be any type of Web-enabled apparatus or system. Examples of such an apparatuses or systems include, but are not limited to, a desktop computer, a laptop computer, a cellular telephone, a personal digital assistant, and an embedded controller.

Device 11 may be connected to an internal network 12, such as a local area network ("LAN"). A router or modem 14 may couple internal network 12 to an external network 15, such as the Internet/World Wide Web. Alternatively, device 11 may be coupled directly to external network 15. External network 15 runs Transmission Control Protocol/Internet Protocol ("TCP/IP") or another suitable protocol. Network connections may be via Ethernet, telephone line, wireless, or other transmission media.

Device 11 contains a processor 17 and a memory 18 for storing software 20. Processor 17 runs software 20, which includes Web client application 21 and operating software. Web client application 21 includes a TCP/IP protocol stack that allows device 11 to communicate over external network 15. The device operating software includes, but is not limited to, an operating system 13, such as Windows XP®, and a Web browser 23, such as Internet Explorer®.

External network 15 contains a server 19, which may be a computer or any other type of processing device. Server 19 communicates with device 11 over external network 15 (and internal network 12, if applicable).

Figure 2:
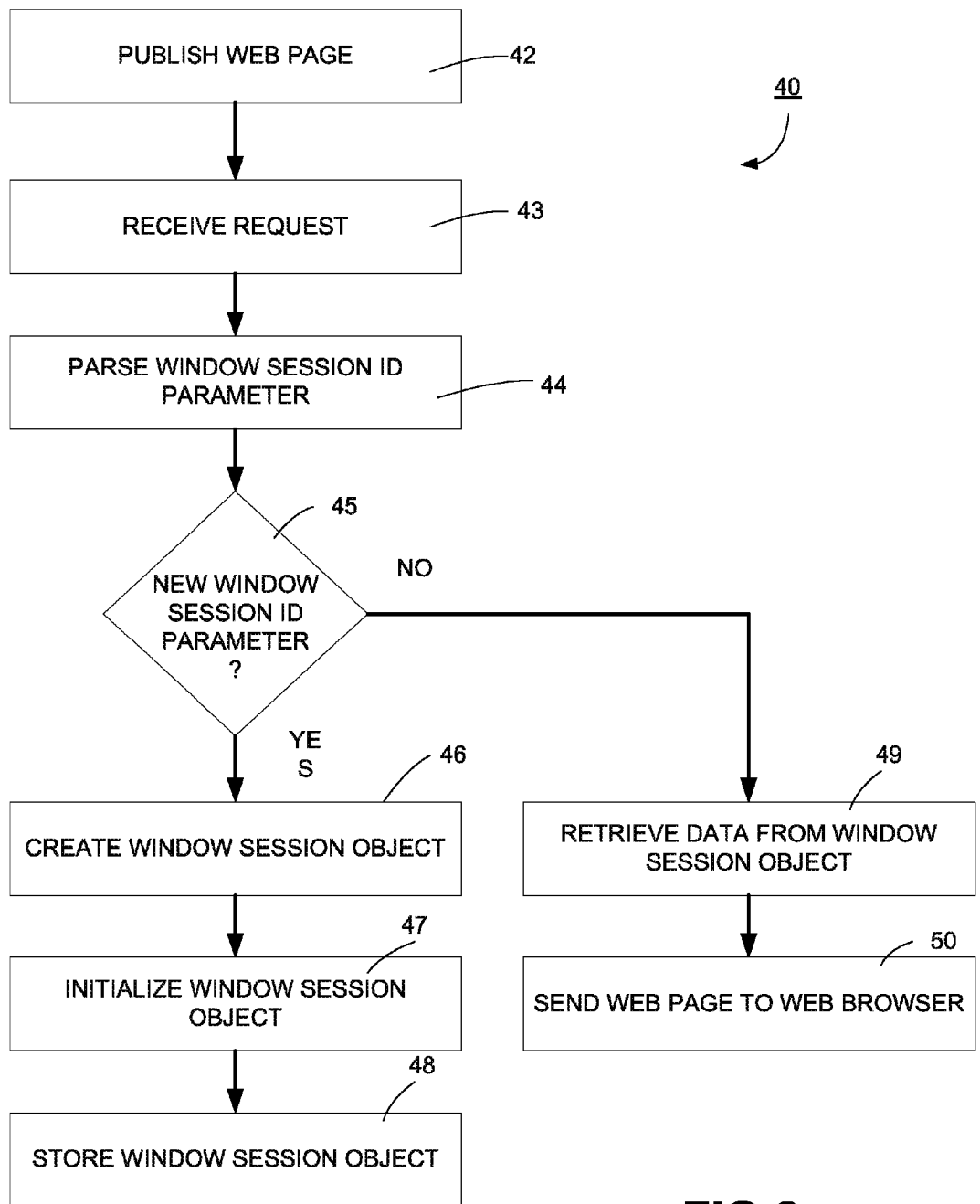
FIG. 2 is a flowchart showing a process by which the server provides Web pages to the device.

Server 19 includes a controller 27, such as a microprocessor, for executing software to perform the functions described below. The software may be stored in memory 24, as shown in FIG. 2.

Server 19 executes Web server software 29 to communicate over external network 15. Web server software 29 also generates and hosts Web pages. The Web pages (not shown) can be accessed and displayed via Web browser 23 on device 11, as described in more detail below.

Web server software 29 may store data in, and retrieve data from, memory area 31. Memory area 31, which may be inside of (shown), or external to, server 19 stores HTTP session object 32, which is associated with a user's HTTP session, and window session objects 34, which are associated with instances (windows) of Web browser 23.

HTTP session objects store state data for an entire interaction, i.e., HTTP session, between Web browser 23 and a Web site (comprised of multiple Web pages) hosted by server 19. For example, HTTP session objects in an electronic commerce ("eCommerce") site may store data that defines a shopping cart with products the user has selected from various Web pages. The HTTP session objects used herein also store a collection of named window session objects 34. Window session objects 34 store state data that is associated with single instances (e.g., windows) of Web browser 23 during an HTTP session. Each window session object corresponds to a single Web browser instance.

In this context, "state data" refers, e.g., to identification and configuration data associated with a Web page. For example, a user may input information, such as an address, into a Web page. The user may also configure that Web page using configuration options available on the page. In this example, the address and configuration constitute the state data. It is noted that other types of state data may exist and that the processes described herein are not limited to use with any particular type of state data, including those noted-herein.

Generally speaking, HyperText Markup Language ("HTML"), i.e., Web, pages are created by servlets (in Java) running within Web server software 29. The servlets also store the HTTP session objects to preserve browser states. Numerous servlets may make up an application, and they all may make use of stored HTTP session objects. Web server software 29 manages the HTTP session objects and provides mapping from a servlet to an individual HTTP session object session. This mapping may be performed using cookies or standard URL rewriting techniques.

Web server software 29 also includes a servlet 35, which performs the process described below for maintaining independent states for browser instances/windows.

Maintaining Independent States For Browser Windows

FIG. 2 shows a process 40 for maintaining independent states for multiple Web browser instances using window session objects. In general, process 40 is a method of URL rewriting that identifies a browser window and compiles a collection of session objects that track each browser window state. A browser window identifier is then used to find and use related session information. As noted, in this embodiment, process 40 is performed by Web server software 29, including servlet 35.

Referring to FIG. 2, Web server software 29 publishes (42) a Web page (not shown). Servlet 35 incorporates, within the published Web page, control feature(s) that can be used to open new Web browser windows and, thus, new Web pages. The control feature may be, e.g., a menu item, a button and/or an image displayed on the Web page. Each control feature includes an embedded hyperlink, which is comprised of a URL and a session identifier ("ID") parameter. The URL identifies the Web page to which the hyperlink refers. The parameter, which is written dynamically by servlet 35, identifies a window session object associated with the Web page.

In this embodiment, the control feature has the following form: URL?window_id=3394, where "URL" is the URL of the Web page, and "window_id=3394" is the session ID parameter. Modifying a URL in this manner is known as "URL encoding". The session ID parameter may be a numeric or alphanumeric string that uniquely identifies each Web browser window (instance) in an HTTP session.

A user at device 11 accesses the Web page published by Web server software 29 via Web browser 23. When the user clicks on the control feature, a new Web browser window opens. The new Web browser window may be opened using a JavaScript function, such as "window.open( )". This function requests a Web page using the Web page URL and a session ID parameter. The request for the Web page is sent from Web browser 23 to server 19 via external network 15. In this embodiment, the request is an HTTP command that includes the Web page URL and the session ID parameter associated with the control feature.

Servlet 35 receives (43) the request from Web browser 23 and parses (44) the session ID parameter from the request. Servlet 35 determines (45) if the session ID parameter is new or existing within the current HTTP session object. Window session objects are indexed using their session ID parameters. Servlet 35 therefore searches through window session objects associated with the HTTP session object for the current HTTP session to locate the session ID parameter received (43) in the request. If the session ID parameter is found, then the session ID parameter is deemed to be existing in the current HTTP session; otherwise, the session ID parameter is new.

If the session ID parameter is new, servlet 35 creates (46) a new window session object and adds the new window session object to the collection of window session objects stored with the HTTP session object. The new window session object contains state data that defines the state of the instance of the Web browser from which the request was sent. Servlet 35 initializes (47) the window session object with state data for the Web browser window. The state data may be obtained from the Web browser window itself and/or from the HTTP session object.

Servlet 35 stores (48) the window session object in association with the current HTTP session object. As noted, the window session object is indexed using the session ID parameter. Look-up tables, for example, may be used to index the window session objects.

Referring back to block 45, if the session ID parameter is determined to be existing, servlet 35 retrieves (49) data from the window session object that corresponds to the session ID parameter. In more detail, servlet 35 accesses the HTTP session object for the current HTTP session and searches the HTTP session object for the corresponding window session object using the session ID parameter. The data in the window session object provides the session state information that servlet 35 uses to create a Web page. Thus, if a Web page was requested with a specific session ID parameter, then all links on that Web page are rewritten to preserve the session ID parameter, i.e., all links are rewritten as "URL?window_id=3394". This is know as URL encoding the links.

If any links on the Web page open yet another window, then they are rewritten with a unique and unused session ID parameter, which will become the session ID parameter of any newly created window(s).

As noted, the window session object contains session state information. This may include selected tabs and columns, search criteria, sort order, and which data set is viewed. Process 40 creates Web pages that preserve the session state information for each window of Web browser 23 in each Web page that it provides to that window.

Thus, process 40 is able to preserve the state of Web pages in different Web browser windows without affecting states of other Web browser windows in the current HTTP session. So, in process 40, when search criteria for a data set in one Web browser window is entered, all other Web browser windows retain their own search criteria for their own corresponding data sets.

Once process 40 creates the Web page, process 40 sends (50) the Web page to Web browser 23, where it is viewed in the appropriate Web browser window.

It is noted that process 40 may be repeated for multiple open Web browser windows. Thus, for another open Web browser window, process 40 receives a request for a second Web page. The request contains a second session ID parameter associated with a second instance of the Web browser. Process 40 stores a second window session object associated with the second session ID parameter. The second window session object contains data defining the state of the second instance of the Web browser. Data in the second window session object may be used to preserve the state of a browser window associated with that object, as described above with respect to process 40.

Architecture and Alternative Embodiments

Process 40 is not limited to use with the hardware/software configuration of FIGS. 1 and 2; it may find applicability in any computing or processing environment. Process 40 may be implemented in hardware (e.g., an ASIC {Application-Specific Integrated Circuit} and/or an FPGA {Field Programmable Gate Array}), software, or a combination of hardware and software.

Process 40 may be implemented using one or more computer programs executing on programmable computers that each includes a processor, a storage medium readable by the processor (including volatile and non-volatile memory and/or storage elements), at least one input device, and one or more output devices.

Each such program may be implemented in a high level procedural or object-oriented programming language to communicate with a computer system. Also, the programs can be implemented in assembly or machine language. The language may be a compiled or an interpreted language.

Each computer program may be stored on a storage medium or device (e.g., CD-ROM, hard disk, or magnetic diskette) that is readable by a general or special purpose programmable computer for configuring and operating the computer when the storage medium or device is read by the computer to perform process 40.

Process 40 may also be implemented as a computer-readable storage medium, configured with a computer program, where, upon execution, instructions in the computer program cause the computer to operate in accordance with process 40.

Figure 3:
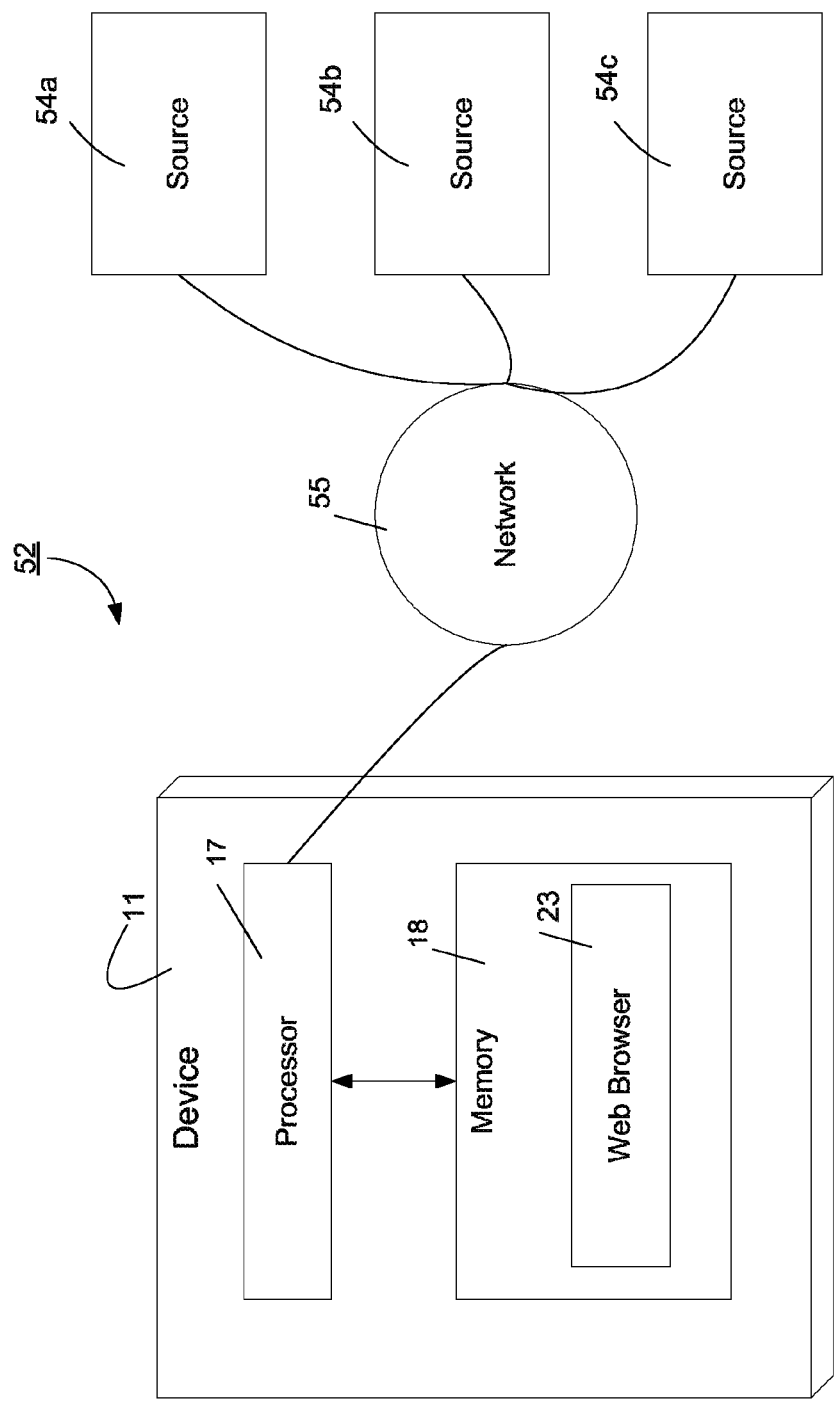
FIG. 3 shows an example of a monitoring system in which the process of FIG. 2 may be implemented.

Device 11 can be included in a monitoring system 52, such as that shown in FIG. 3 and described in U.S. application Ser. No. 10/214,939, filed on Aug. 8, 2002, the contents of which are hereby incorporated by reference into this application as if set forth herein in full.

Monitoring system 52 includes sources 54a, 54b and 54c, a network 55 (e.g., Internet), and Web browser 23 running on device 11. Information may be sent from sources 54a to 54c through network 55 to device 11. Sources 54a to 54c may include equipment (e.g., pumps, generators, etc.), databases that store collected data (e.g., sales, production numbers, etc.), applications servers, or any combination thereof. The information sent to device 11 may accessed by a user interface ("UI"), such as Web browser 23, that has multiple windows to display information. The states of individual ones of these multiple windows may be preserved using process 40 of FIG. 2.

The invention is not limited to use with the protocols and standards described above. For example, process 40 is not limited to the block ordering show in FIG. 2. One or more of the blocks may be omitted or rearranged. Additional blocks, which contain additional process steps, may be inserted into the flow of FIG. 2 Process 40 is not limited to the protocols and software described herein. Rather, process 40 may be implemented in any computing environment using different protocols or combinations of different protocols and those described herein.

Process 40 is not limited to providing a separate window session object for each Web browser window. Rather, groups of Web browser windows within a single HTTP session may be governed by a single window session object. In such an embodiment, changes in the state of a single Web browser window in the group may change the state of others in the group, but not affect the state of open Web browser windows outside the group but in the same HTTP session.

The invention is not limited to the Web browser state information described herein. The invention may be used with any type of state information or other type of Web browser configuration information. The invention also may be used outside the context of a Web browser and/or the Internet/World Wide Web. That is, the invention may be used with any type of windowing application in order to preserve the state of one window without affecting states of other windows that may be opened in the application.

Other embodiments not described herein are also within the scope of the following claims:

What is claimed is:

1. A method, performed by a server, for use in maintaining states of instances of a Web browser on a device that is configured for communicating with the server, the method comprising:
   receiving, from the device, a request for a first Web page, the request comprising a first URL-encoded session identifier (ID) associated with a first instance of the Web browser;
   storing, in the server, a first session object associated with the first URL-encoded session ID, the first session object containing data defining a state of the first instance of the Web browser, wherein the first instance of the Web browser comprises a first Web browser window;
   generating, in the server, the first Web page using the data in the first session object;
   receiving, from the device, a request for a second Web page, the request comprising a second URL-encoded session identifier (ID) associated with a second instance of the Web browser, wherein the second instance of the Web browser comprises a second Web browser window;
   storing, in the server, a second session object associated with the second session ID, the second session object containing data defining a state of the second instance of the Web browser;
   generating, in the server, the second Web page using the data in the second session object; and
   outputting, from the server to the device, the first Web page and the second Web page; and
   maintaining, via the first session object, a state of the first Web page such that the state of the first Web page is not affected when a state of the second Web page is changed in response to submission of information in the second Web page to the server, thereby preserving the state of the first instance of the Web browser; or maintaining, via the second session object, the state of the second Web page such that the state of the second Web page is not affected when the state of the first Web page is changed in response to submission of information in the first Web page to the server, thereby preserving the state of the second instance of the Web browser.

2. The method of claim 1, wherein storing the first session object comprises:
   creating the first session object; and
   initializing the first session object with data; and
   wherein storing the second session object comprises:
   creating the second session object; and
   initializing the second session object with data.

3. The method of claim 1, wherein the first session object and the second session object are stored in association with a HyperText Transfer Protocol (HTTP) session object, the HTTP session object containing state data that relates to an interaction between the Web browser and a Web site that contains the first Web page and the second Web page.

4. The method of claim 1, wherein the request for the first Web page is issued from an original Web page, and the method further comprises:
   providing the original Web page to the Web browser, the original Web page containing a control feature that contains the first URL-encoded session ID, the control feature being used to issue the request for the first Web page.

5. The method of claim 4, wherein the control feature comprises at least one of a menu item, a hyperlink, a button and an image.

6. The method of claim 1, wherein each request comprises a HyperText Transfer Protocol (HTTP) command.

7. The method of claim 1, wherein the first session object is used to maintain the state of the first Web page by:
   accessing the first session object;
   updating the first Web page based on data in the first session object; and
   providing the first Web page to the first instance of the Web browser; and
   wherein the second session object is used to maintain the state of the second Web page by:
   accessing the second session object;
   updating the second Web page based on data in the second session object; and
   providing the second Web page to the second instance of the Web browser.

8. The method of claim 7, further comprising:
   determining if the first URL-encoded session ID is a new or existing;
   wherein accessing the first session object is performed only if the first URL-encoded session ID is existing; and
   determining if the second URL-encoded session ID is a new or existing; and
   wherein accessing the second session object is performed only if the second URL-encoded session ID is existing.

9. The method of claim 1, wherein the state of the first Web page when changed is different from the state of the second Web page when changed, and wherein the request for the first Web page and the request for the second Web page comprise parts of a same interaction between the Web browser and the server.

10. A non-transitory machine-readable medium that stores executable instructions for use in maintaining states of instances of a Web browser on a device, the instructions for causing a server, which is in communication with, and remote from, the device to:
   receive, from the device, a request for a first Web page, the request comprising a first URL-encoded session identifier (ID) associated with a first instance of the Web browser;

store, in the server, a first session object associated with the first URL-encoded session ID, the first session object containing data defining a state of the first instance of the Web browser, wherein the first instance of the Web browser comprises a first Web browser window;

generate, in the server, the first Web page using the data in the first session object;

receive, from the device, a request for a second Web page, the request comprising a second URL-encoded session identifier (ID) associated with a second instance of the Web browser, wherein the second instance of the Web browser comprises a second Web browser window;

store, in the server, a second session object associated with the second URL-encoded session ID, the second session object containing data defining a state of the second instance of the Web browser;

generate, in the server, the second Web page using the data in the second session object;

output, from the server to the device, the first Web page and the second Web page; and maintain, via the first session object, a state of the first Web page such that the state of the first Web page is not affected when a state of the second Web page is changed in response to submission of information in the second Web page to the server, thereby preserving the state of the first instance of the Web browser; or maintain, via the second session object, the state of the second Web page such that the state of the second Web page is not affected when the of the first Web page is changed in response to submission of information in the first Web page to the server, thereby preserving the state of the second instance of the Web browser.

11. The non-transitory machine-readable medium of claim 10, wherein storing the first session object comprises:
creating the first session object; and
initializing the first session object with data; and
wherein storing the second session object comprises:
creating the second session object; and
initializing the second session object with data.

12. The non-transitory machine-readable medium of claim 10, wherein the first session object and the second session object are stored in association with a HyperText Transfer Protocol (HTTP) session object, the HTTP session object containing state data that relates to an interaction between the Web browser and a Web site that contains the first Web page and the second Web page.

13. The non-transitory machine-readable medium of claim 10, wherein the request for the first Web page is issued from an original Web page, and the machine-readable medium further comprises instructions that cause the server to:
provide the original Web page to the Web browser, the original Web page containing a control feature that contains the first URL-encoded session ID, the control feature being used to issue the request for the first Web page.

14. The non-transitory machine-readable medium of claim 13, wherein the control feature comprises at least one of a menu item, a hyperlink, a button and an image.

15. The non-transitory machine-readable medium of claim 10, wherein each request comprises a HyperText Transfer Protocol (HTTP) command.

16. The non-transitory machine-readable medium of claim 10, wherein the first session object is used to maintain the state of the first Web page by:
accessing the first session object;
updating the first Web page based on data in the first session object; and
providing the first Web page to the first instance of the Web browser; and
wherein the second session object is used to maintain the state of the second Web page by:
accessing the second session object;
updating the second Web page based on data in the second session object; and
providing the second Web page to the second instance of the Web browser.

17. The non-transitory machine-readable medium of claim 16, further comprising instructions that cause the server to:
determine if the first URL-encoded session ID is a new or existing;
wherein accessing the first session object is performed only if the first URL-encoded session ID is existing;
determine if the second URL-encoded session ID is a new or existing; and
wherein accessing the second session object is performed only if the second URL-encoded session ID is existing.

18. The non-transitory machine-readable medium of claim 10, wherein the state of the first Web page when changed is different from the state of the second Web page when changed, and wherein the request for the first Web page and the request for the second Web page comprise parts of a same interaction between the Web browser and the server.

19. A server for use in maintaining states of instances of a Web browser on a device that is in communication with, and remote from, the server, the server comprising:
memory that stores executable instructions; and
a processor to execute the instructions to:
receive, from the device, a request for a first Web page, the request comprising a first URL-encoded session identifier (ID) associated with a first instance of the Web browser;
store, in the server, a first session object associated with the first URL-encoded session ID, the first session object containing data defining a state of the first instance of the Web browser, wherein the first instance of the Web browser comprises a first Web browser window;
generate, in the server, the first Web page using the data in the first session object;
receive, from the device, a request for a second Web page, the request comprising a second URL-encoded session identifier (ID) associated with a second instance of the Web browser;
store, in the server, a second session object associated with the second URL-encoded session ID, the second session object containing data defining a state of the second instance of the Web browser, wherein the second instance of the Web browser comprises a second Web browser window;
generate, in the server, the second Web page using the data in the second session object;
output, from the server to the device, the first Web page and the second Web page; and
maintain, via the first session object, a state of the first Web page such that the state of the first Web page is not affected when a state of the second Web page is changed in response to submission of information in the second Web page to the server, thereby preserving the state of the first instance of the Web browser; or maintain, via the second session object, the state of the second Web page such that the state of the second Web page is not affected when the state of the first Web page is changed in response to submission of information in the first Web page to the server, thereby preserving the state of the second instance of the Web browser.

20. The server of claim 19, wherein storing the first session object comprises:
   creating the first session object; and
   initializing the first session object with data; and
   wherein storing the second session object comprises:
   creating the second session object; and
   initializing the second session object with data.

21. The server of claim 19, wherein the first session object and the second session object are stored in association with a HyperText Transfer Protocol (HTTP) session object, the HTTP session object containing state data that relates to an interaction between the Web browser and a Web site that contains the first Web page and the second Web page.

22. The server of claim 19, wherein the request for the first Web page is issued from an original Web page, and the processor is configured to execute instructions to:
   provide the original Web page to the Web browser, the original Web page containing a control feature that contains the first URL-encoded session ID, the control feature being used to issue the request for the first Web page.

23. The server of claim 22, wherein the control feature comprises at least one of a menu item, a hyperlink, a button and an image.

24. The server of claim 19, wherein each request comprises a HyperText Transfer Protocol (HTTP) command.

25. The server of claim 19, wherein the processor is configured to execute instructions to receive a request for a target Web page, the request comprising a URL-encoded session identifier (ID) associated with an instance of a Web browser; wherein the first session object is used to maintain the state of the first Web page by:
   accessing the first session object;
   updating the first Web page based on data in the first session object; and
   providing the first Web page to the first instance of the Web browser; and
wherein the second session object is used to maintain the state of the second Web page by:
   accessing the second session object;
   updating the second Web page based on data in the second session object; and
   providing the second Web page to the second instance of the Web browser.

26. The server of claim 25, wherein the processor is configured to execute instructions to:
   determine if the first URL-encoded session ID is a new or existing;
   wherein accessing the first session object is performed only if the first URL-encoded session ID is existing; and
   determine if the second URL-encoded session ID is a new or existing;
   wherein accessing the second session object is performed only if the second URL-encoded session ID is existing.

27. The server of claim 19, wherein the state of the first Web page when changed is different from the state of the second Web page when changed, and wherein the request for the first Web page and the request for the second Web page comprise parts of a same interaction between the Web browser and the server.

* * * * *

UNITED STATES PATENT AND TRADEMARK OFFICE
CERTIFICATE OF CORRECTION

Page 1 of 1

PATENT NO. : 8,635,254 B2
APPLICATION NO. : 10/637757
DATED : January 21, 2014
INVENTOR(S) : Matthew Harvey et al.

It is certified that error appears in the above-identified patent and that said Letters Patent is hereby corrected as shown below:

In the Claims

Column 9, Line 29, In Claim 10, after "when the" insert -- state --.

Signed and Sealed this
Twenty-first Day of October, 2014

Michelle K. Lee
*Deputy Director of the United States Patent and Trademark Office*